United States Patent
Lee et al.

(10) Patent No.: US 11,114,682 B2
(45) Date of Patent: Sep. 7, 2021

(54) FUEL CELL SYSTEM AND METHOD FOR CONTROLLING THE SAME

(71) Applicants: Hyundai Motor Company, Seoul (KR); Kia Motors Corporation, Seoul (KR)

(72) Inventors: Hyun Jae Lee, Seoul (KR); Sun Heum Baek, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 287 days.

(21) Appl. No.: 16/286,968

(22) Filed: Feb. 27, 2019

(65) Prior Publication Data

US 2020/0153010 A1 May 14, 2020

(30) Foreign Application Priority Data

Nov. 14, 2018 (KR) .................. 10-2018-0140195

(51) Int. Cl.
| | |
|---|---|
| *H01M 8/04664* | (2016.01) |
| *H01M 8/0438* | (2016.01) |
| *H01M 8/04992* | (2016.01) |
| *H01M 8/04119* | (2016.01) |
| *H01M 8/04858* | (2016.01) |
| *H01M 8/04082* | (2016.01) |

(52) U.S. Cl.
CPC ..... *H01M 8/04679* (2013.01); *H01M 8/0488* (2013.01); *H01M 8/04179* (2013.01); *H01M 8/04201* (2013.01); *H01M 8/04395* (2013.01); *H01M 8/04992* (2013.01)

(58) Field of Classification Search
CPC ......... H01M 8/04302; H01M 8/04225; H01M 8/04395; H01M 8/0441
See application file for complete search history.

(56) References Cited

U.S. PATENT DOCUMENTS

| | | | | |
|---|---|---|---|---|
| 2003/0198845 A1* | 10/2003 | Nakanishi | ........... | H01M 8/2457 429/444 |
| 2013/0149620 A1* | 6/2013 | Fabian | .............. | H01M 8/04373 429/416 |
| 2014/0072895 A1* | 3/2014 | Becker | .............. | H01M 8/04425 429/444 |
| 2016/0141677 A1* | 5/2016 | Imanishi | ........... | H01M 8/04664 429/429 |
| 2016/0351925 A1 | 12/2016 | Lee et al. | | |

FOREIGN PATENT DOCUMENTS

JP          2017021964 A   *   1/2017

OTHER PUBLICATIONS

Machine translation of JP 2017-021964 A (Year: 2017).*

* cited by examiner

*Primary Examiner* — Robert S Carrico
(74) *Attorney, Agent, or Firm* — Mintz Levin Cohn Ferris Glovsky and Popeo, P.C.; Peter F. Corless (57) ABSTRACT

A method for controlling a fuel cell system is provided. The method includes upon start of a fuel cell stack, obtaining a flow rate of air supplied into a cathode after an air regulator for regulating the air supplied into the cathode is opened. A sealing state of the fuel cell stack is then determined based on the obtained flow rate of the air.

12 Claims, 5 Drawing Sheets

NORMAL SEALING STATE

FIG.5A

ABNORMAL SEALING STATE

FIG.5B

FUEL CELL SYSTEM AND METHOD FOR CONTROLLING THE SAME

CROSS-REFERENCE TO RELATED APPLICATION

This application is claims the benefit of priority to Korean Patent Application No. 10-2018-0140195, filed on Nov. 14, 2018, the entire contents of which are incorporated herein by reference.

TECHNICAL FIELD

The present disclosure relates to a fuel cell system and a method for controlling the same, and more particularly, to a fuel cell system for determining a sealing state of a fuel cell stack, based on an air flow rate and to a method for controlling the fuel cell system.

BACKGROUND

Fuel cell systems, which continually produce electrical energy through an electro-chemical reaction of fuel continuously supplied thereto, have been consistently studied and developed as an alternative for solving global environmental problems. The fuel cell systems may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), and a direct methanol fuel cell (DMFC) according to the types of electrolytes used. The fuel cell systems may be applied to various applications, such as mobile power supply, transportation, distributed power generation, and the like, according to operating temperatures and output ranges along with the types of fuels used.

Among the fuel cells mentioned above, the PEMFC is applied to a hydrogen vehicle (a hydrogen fueled cell vehicle) that is being developed to replace an internal combustion engine. The hydrogen vehicle is driven by producing electricity through an electro-chemical reaction of hydrogen and oxygen and operating a motor with the electricity produced. The hydrogen vehicle has a structure that includes a hydrogen tank (H2 tank) for storing hydrogen (H2), a fuel cell stack (FC stack) for producing electricity through oxidation/reduction reactions of hydrogen (H2) and oxygen (02), various devices for draining water produced, a battery for storing the electricity produced by the fuel cell stack, a controller that converts and adjusts the electricity produced, a motor that generates a driving force, and the like.

The fuel cell stack refers to a fuel cell body having tens or hundreds of cells stacked in series. The fuel cell stack has a structure in which a plurality of cells are stacked between end plates, each cell including an electrolyte membrane that divides the interior of the cell into two parts, an anode on a first side of the electrolyte membrane, and a cathode on a second side thereof. A separator is disposed between the cells to restrict flow paths of hydrogen and oxygen. The separator is made of a conductor to move electrons during oxidation/reduction reactions.

When hydrogen is supplied to the anode, the hydrogen is divided into hydrogen ions and electrons by a catalyst. The electrons produce electricity while moving outside the fuel cell stack through the separator. The hydrogen ions pass through the electrolyte membrane and move to the cathode, after which the hydrogen ions are combined with oxygen supplied from ambient air and electrons to produce water, and the water produced is discharged to the outside.

In a fuel cell system, it is important to maintain the air tightness of a fuel cell stack. When the fuel cell stack starts to operate and air is unintentionally introduced into the fuel cell stack due to a poor sealing state thereof while the fuel cell stack is stopped, excessive high voltage may be generated in the fuel cell stack, and therefore the fuel cell stack may be damaged. Accordingly, a technology for directly detecting the sealing performance of the fuel cell stack is required.

SUMMARY

The present disclosure provides a fuel cell system for directly detecting the sealing performance of a fuel cell stack when the fuel cell system starts to operate, and a method for controlling the fuel cell system. Another aspect of the present disclosure provides a fuel cell system for effectively detecting a poor sealing state of a fuel cell stack to prevent excessive high voltage from being generated in the fuel cell stack or prevent the high voltage from being sustained even though the high voltage is generated, thereby preventing damage to the fuel cell system, and a method for controlling the fuel cell system.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a method for controlling a fuel cell system may include, upon start of a fuel cell stack, obtaining a flow rate of air supplied into a cathode immediately after an air regulator for regulating the air supplied into the cathode is opened and determining a sealing state of the fuel cell stack, based on the obtained flow rate of the air.

According to another aspect of the present disclosure, a fuel cell system may include at least one processor, an air flow-rate acquisition device connected to the at least one processor and configured to obtain a flow rate of air supplied into a cathode, and a memory connected to the at least one processor and configured to store a plurality of instructions. The instructions, when executed, cause the processor to operate, upon start of a fuel cell stack, the air flow-rate acquisition device to obtain the flow rate of the air supplied into the cathode immediately after an air regulator for regulating the air supplied into the cathode is opened and determine a sealing state of the fuel cell stack, based on the obtained flow rate of the air.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. It should be understood that even if shown in different drawings, identical components are provided with identical reference numerals in the drawings. Furthermore, in describing the exemplary embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component, and the substance, sequence, order, or number of these components is not limited by these terms. If a component were described as "connected", "coupled", or "linked" to another component, they may mean the components are not only directly "connected", "coupled", or "linked" but also are indirectly "connected", "coupled", or "linked" via a third component.

Figure 1:
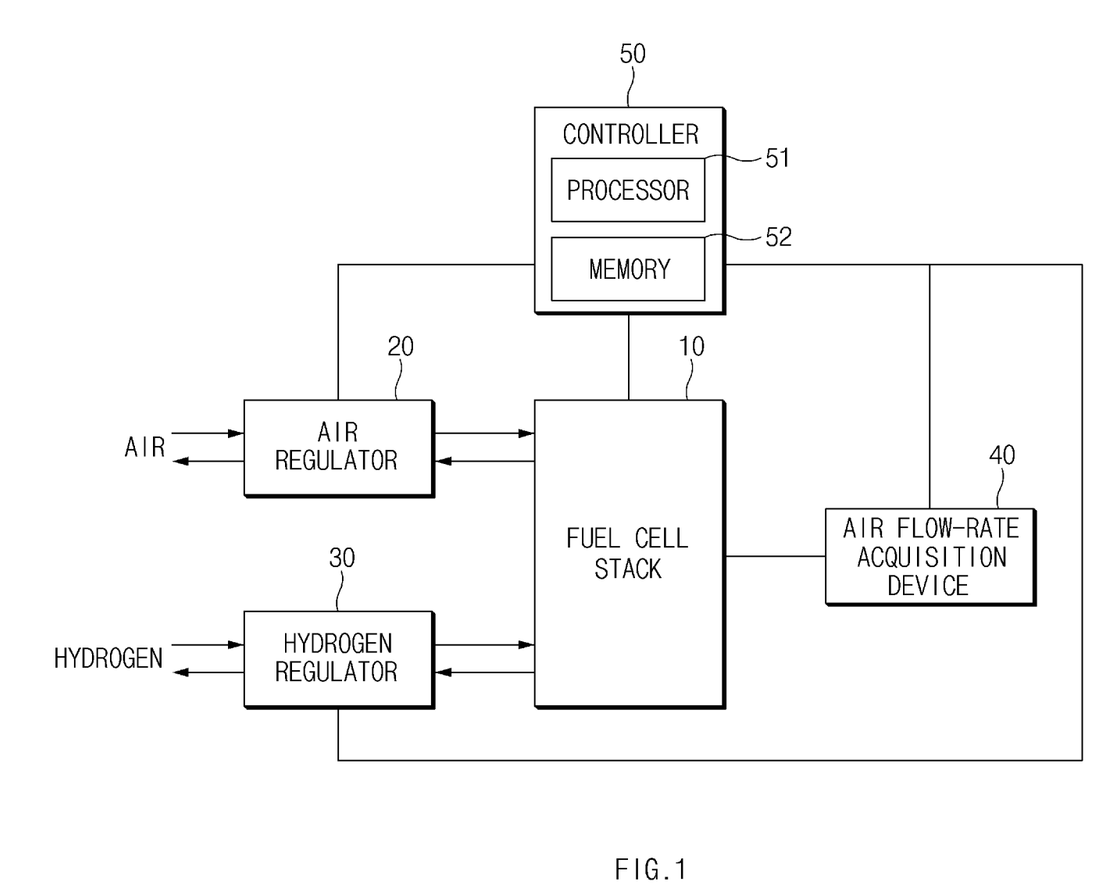
FIG. 1 is a block diagram illustrating a fuel cell system according to an exemplary embodiment of the present disclosure.
Figure 2:
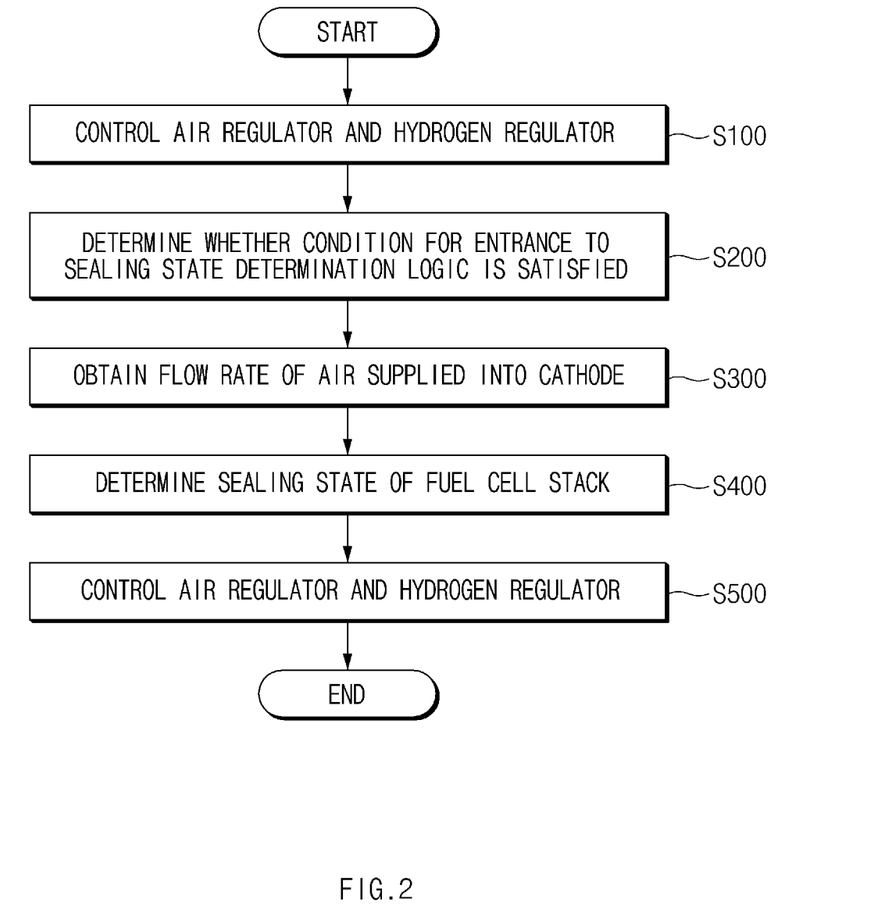
FIG. 2 is a flowchart illustrating a method for controlling the fuel cell system according to an exemplary embodiment of the present disclosure.

FIG. 1 is a block diagram illustrating a fuel cell system according to an exemplary embodiment of the present disclosure, and FIG. 2 is a flowchart illustrating a method for controlling the fuel cell system according to an exemplary embodiment of the present disclosure.

The fuel cell system according to this exemplary embodiment may include a fuel cell stack 10, an air regulator 20, a hydrogen regulator 30, an air flow-rate acquisition device 40, and a controller 50. The controller 50 may include a processor 51 and a memory 52. The fuel cell stack 10 produces electricity and water through an electro-chemical reaction of hydrogen and air. Additionally, the fuel cell stack 10 includes a plurality of fuel cells stacked, each of which may include an electrolyte membrane and a pair of electrodes (e.g., a cathode (or an air electrode) and an anode (or a fuel electrode)) disposed on opposite sides of the electrolyte membrane. The fuel cell stack 10 produces electricity through an electro-chemical reaction of hydrogen and oxygen.

While the fuel cell system is operating, air including oxygen may be supplied into the cathode of the fuel cell stack 10, and hydrogen may be supplied into the anode of the fuel cell stack 10. At this time, the air and the hydrogen may be heated to a high temperature appropriate for a reaction and then supplied into the fuel cell stack 10. In addition, the fuel cell stack 10 needs to be maintained at a predetermined humidity or higher for a chemical reaction. Accordingly, the air may be humidified and then supplied into the fuel cell stack 10.

The air regulator 20 may be configured to regulate the air that is supplied into the cathode. In particular, the air regulator 20 may be configured to receive compressed air from an air supply device (not illustrated) and supply the compressed air into the fuel cell stack 10. The air regulator 20 may also be configured to regulate the air that is released from the fuel cell stack 10. The air regulator 20 may include one or more valves. In an exemplary embodiment, the air regulator 20 may include an air pressure valve and an air cut-off valve.

Particularly, the air cut-off valve may be configured to open or cut off (e.g., block) an air flow passage. The air cut-off valve may be implemented with an airtight flip-type valve. Without being limited thereto, however, various types of valves may be used as the air cut-off valve. The air pressure valve may be configured to regulate the pressure of the air supplied into the fuel cell stack 10 or the pressure of the air released from the fuel cell stack 10. Various types of valves well known in the related art may be used as the air pressure valve.

Further, the hydrogen regulator 30 may be configured to regulate the hydrogen supplied into the anode. The hydrogen regulator 30 may be configured to receive hydrogen from a hydrogen supply device (not illustrated) and supply the hydrogen into the fuel cell stack 10. Additionally, the hydrogen regulator 30 may be configured to regulate the hydrogen that is released from the fuel cell stack 10 and may include one or more valves. In an exemplary embodiment, the hydrogen regulator 30 may include a hydrogen pressure valve and a hydrogen cut-off valve.

Particularly, the hydrogen cut-off valve may be configured to open or cut off (e.g., block) a hydrogen flow passage. The hydrogen cut-off valve may be implemented with an airtight flip-type valve. Without being limited thereto, however, various types of valves may be used as the hydrogen cut-off valve. The hydrogen pressure valve may be configured to regulate the pressure of the hydrogen supplied into the fuel cell stack 10 or the pressure of the hydrogen released from the fuel cell stack 10. Various types of valves well known in the related art may be used as the hydrogen pressure valve.

The air flow-rate acquisition device 40 may be configured to obtain the flow rate of the air supplied into the cathode. For example, the air flow-rate acquisition device 40 may include a flow meter configured to measure the flow rate of fluid that passes through a flow passage per unit time. The air flow-rate acquisition device 40 may be installed in a flow passage that connects the air regulator 20 and the fuel cell stack 10 and may be configured to obtain the flow rate of the air supplied into the fuel cell stack 10.

Furthermore, the controller 50 may be configured to execute the overall configuration of the fuel cell system. The controller 50 may be implemented with one or more controllers. The controller 50 may be configured to obtain information or signals relating to the fuel cell system from the components of the fuel cell system. The controller 50 may include the processor 51 and the memory 52. The memory 52 may be configured to store instructions and the processor 51 may be configured to execute the instructions to perform processes that will be described below. The controller 50 may be integrated with a controller included in another device of a vehicle other than the fuel cell system.

The controller 50 may be implemented as a non-volatile computer readable medium that includes executable program commands. Thus, the controller 50 may be specifically programmed to execute the program commands. Examples of the computer readable medium may include, but are not limited to, a read-only memory (ROM), a random access memory (RAM), a compact disk (CD)-ROM, a magnetic tape, a floppy disk, a flash drive, and a smart card, and an optical data storage device. The controller 50 may be implemented with at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

Figure 3:
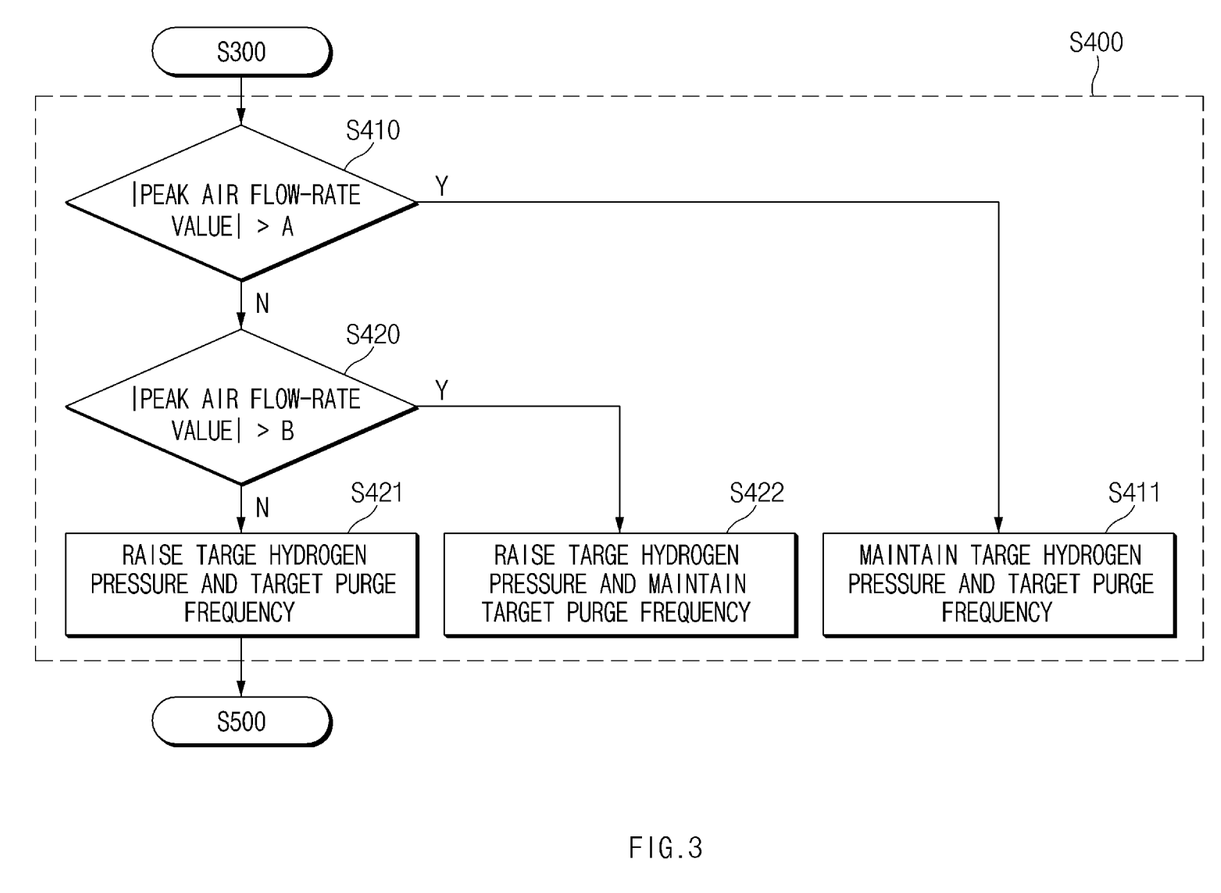
FIG. 3 is a view illustrating step S400 of FIG. 2 according to an exemplary embodiment of the present disclosure.

FIG. 3 is a view illustrating step S400 of FIG. 2, and FIGS. 4A, 4B, 5A and 5B are views illustrating an operation of the method for controlling the fuel cell system according to the exemplary embodiment of the present disclosure. Hereinafter, the method for controlling the fuel cell system according to the exemplary embodiment of the present disclosure will be described with reference to FIG. 2.

When obtaining a signal for turning on the fuel cell stack 10, the controller 50 may be configured to operate the air regulator 20 to allow air to be supplied into the cathode and prevent the air from being released from the cathode and may be configured to operate the hydrogen regulator 30 to allow hydrogen to be supplied into the anode and prevent the hydrogen from being released from the anode (Step S100). To allow the supply of the air into the cathode, the controller 50 may be configured to open the air cut-off valve to generate an air flow by the pressure inside the cathode. To prevent the air or hydrogen from being released, the controller 50 may be configured to block the air pathway.

Figure 4A:
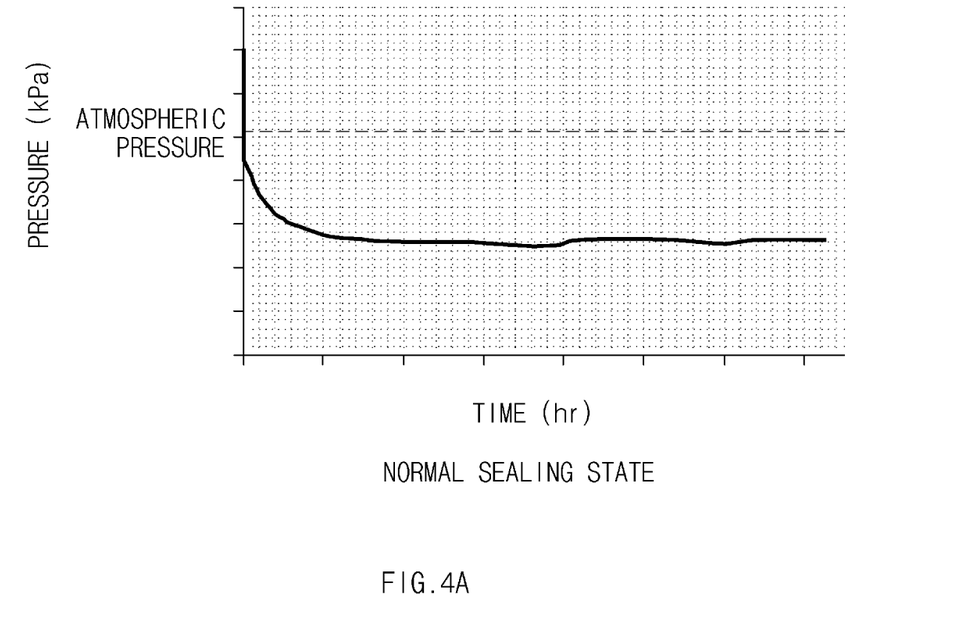
FIGS. 4A, 4B, 5A and 5B are views illustrating an operation of the method for controlling the fuel cell system according to the exemplary embodiment of the present disclosure.
Figure 4B:
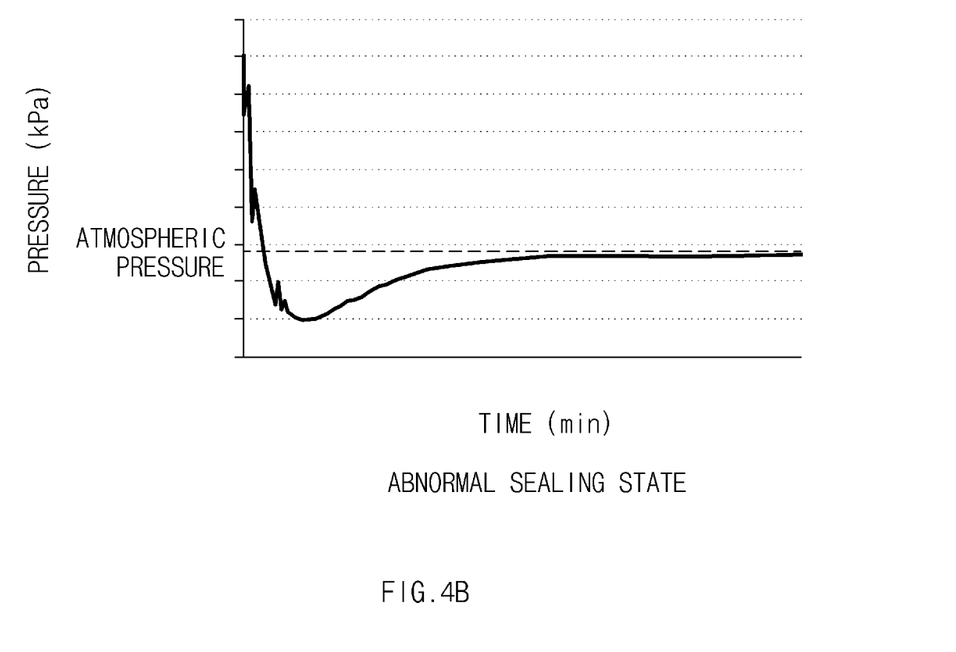

FIGS. 4A and 4B illustrate graphs depicting the pressure inside the cathode when the fuel cell stack 10 is in a good sealing state (e.g., sealing is sufficient to prevent leak) and when in a poor sealing state (e.g., insufficient, leaks occur). Referring to FIG. 4A, when the fuel cell stack 10 is in a good sealing state, the pressure inside the cathode is maintained below atmospheric pressure after the fuel cell stack 10 stops operating and a predetermined period of time passes. Accordingly, even though an air compressor does not operate, air may be supplied into the cathode by a negative pressure formed inside the cathode when the air cut-off valve is opened. Referring to FIG. 4B, when the fuel cell stack 10 is in a poor sealing state, the pressure inside the cathode is almost the same as atmospheric pressure after the fuel cell stack 10 stops operating and a predetermined period of time passes. Accordingly, air may not be supplied into the cathode when the air cut-off valve is opened, with the air compressor not in operation.

The controller 50 may be configured to determine whether a condition for entrance to logic for determining a sealing state of the fuel cell stack 10 is satisfied (Step S200). In an exemplary embodiment, the controller 50 may be configured to perform step S200 before or simultaneously as step S100. In addition, when the hydrogen pressure inside the anode is not within a preset range, the controller 50 may be configured to determine that the condition for entrance to the sealing state determination logic is satisfied.

For example, when the absolute value of the hydrogen pressure inside the anode, which is detected by a hydrogen pressure sensor, is less than a preset value, the controller 50 may be configured to determine that the condition for entrance to the sealing state determination logic is satisfied. When the hydrogen pressure inside the anode, which is detected by the hydrogen pressure sensor, is less than −P1 (P1 being greater than zero) or greater than P2 (P2 being greater than zero), the controller 50 may be configured to determine that the condition for entrance to the sealing state determination logic is satisfied.

Further, the controller 50 may be configured to obtain the flow rate of the air using the air flow-rate acquisition device 40 immediately after the air regulator 20 is opened to allow the supply of the air into the cathode. When the air flow rate obtained is zero, the controller 50 may be configured to determine that the condition for entrance to the sealing state determination logic is satisfied. Alternatively, when the air flow rate obtained is less than a preset value, the controller 50 may be configured to determine that the condition for entrance to the sealing state determination logic is satisfied.

In an exemplary embodiment, the controller 50 may be configured to determine whether the condition for entrance to the sealing state determination logic is satisfied, based on a result obtained by determining whether elapsed time from when the fuel cell stack 10 stops operating right before is greater than or equal to preset time. For example, when the elapsed time from when the fuel cell stack 10 stops operating right before is less than the preset time (e.g., about one hour), the controller 50 may be configured to determine that the condition for entrance to the sealing state determination logic is not satisfied and the fuel cell stack 10 is normal (e.g., no errors or malfunctions detected).

When a predetermined period of time does not pass from when the fuel cell stack 10 stops operating, the pressure inside the fuel cell stack 10 may not significantly decrease even though the fuel cell stack 10 is in a normal sealing state. In other words, when the predetermined period of time does not pass from when the fuel cell stack 10 stops operating, the air flow rate when the air regulator 20 is opened may be close to zero even though the fuel cell stack 10 is in the normal sealing state. Therefore, since it is meaningless to determine the sealing state of the fuel cell stack 10 using the air flow rate in the state in which the predetermined period of time does not pass from when the fuel cell stack 10 stops operating, the fuel cell stack 10 may be allowed to operate normally.

Moreover, the controller 50 may be configured to obtain the flow rate of the air supplied into the cathode using the air flow-rate acquisition device 40 immediately after the air regulator 20 is opened to allow the supply of the air into the cathode (Step S300). In an exemplary embodiment, the controller 50 may be configured to operate the air flow-rate acquisition device 40 to obtain the flow rate of the air for a preset period of time every preset unit time interval immediately after the air regulator 20 is opened to allow the supply of the air into the cathode. The controller 50 may then be configured to determine the sealing state of the fuel cell stack 10, based on the air flow rate obtained (Step S400). For example, when the fuel cell stack 10 is in a poor sealing state, sealing between the fuel cells constituting the fuel cell stack 10 may be defective, or the air cut-off valve may be in a poor sealing state.

Referring to FIG. 4A, when the fuel cell stack 10 is in a good sealing state, the pressure inside the cathode decreases, converges to a predetermined value, and remains at the converged pressure as time passes after the fuel cell stack 10 stops operating. In particular, when the fuel cell stack 10 stops operating, air or hydrogen are not allowed to be supplied into and released from the fuel cell stack 10. Hydrogen, oxygen, nitrogen, and the like that remain inside the fuel cell stack 10 move from the cathode to the anode or vice versa through the electrolyte membrane, water is produced through a reaction of the hydrogen and the oxygen, and the number of moles existing in a gaseous state inside the fuel cell stack 10 decrease. Therefore, the pressure inside the anode and the pressure inside the cathode decrease and converge to a predetermined pressure less than atmospheric pressure as time passes after the stop of the fuel cell stack 10. At this time, the pressure inside the anode and the pressure inside the cathode almost identically converge.

Meanwhile, referring to FIG. 4B, when the fuel cell stack 10 is in a poor sealing state, the pressure inside the cathode temporarily decreases and then returns to atmospheric pressure after the fuel cell stack 10 stops operating. When the fuel cell stack 10 is in the poor sealing state, air may be supplied into the cathode or the anode. Therefore, even though the pressure inside the anode or the cathode decreases, ions move through the electrolyte membrane and the pressure may be restored.

Figure 5A:
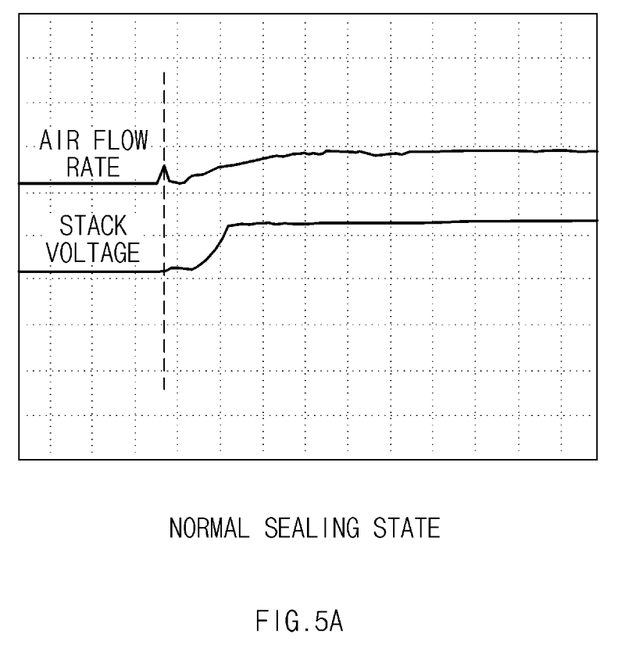

Referring to FIG. 5A, when the fuel cell stack 10 is in a good sealing state, the pressure inside the cathode may be maintained at a predetermined pressure below atmospheric pressure as described above, and when the air regulator 20 is opened in this state, air may be supplied into the cathode by the pressure differential. Meanwhile, referring to FIG. 5B, when the fuel cell stack 10 is in a poor sealing state, the pressure inside the cathode is almost the same as atmospheric pressure as described above, and even though the air regulator 20 is opened in this state, an air flow due to a pressure differential does not occur.

In an exemplary embodiment, the controller 50 may be configured to determine the sealing state of the fuel cell stack 10, based on a peak air flow-rate value. The peak air flow-rate value may be defined to be the highest of air flow-rate values obtained every preset unit time interval. In addition, the controller 50 may be configured to determine the sealing state of the fuel cell stack 10, based on the absolute value of the air flow rate.

In response to determining that the fuel cell stack 10 is in a normal (or good) sealing state, the controller 50 may be configured to operate the air regulator 20 and the hydrogen regulator 30 to allow the air and the hydrogen to be released from the cathode and the anode, respectively (Step S500). In response to determining that the fuel cell stack 10 is in the normal sealing state, the controller 50 may be configured to operate the air regulator 20 and the hydrogen regulator 30 to supply hydrogen and air into the fuel cell stack 10, release hydrogen and air from the fuel cell stack 10, and operate the fuel cell stack 10 normally.

Meanwhile, in response to determining that the fuel cell stack 10 is in an abnormal (or poor) sealing state, the controller 50 may be configured to operate the hydrogen regulator 30, which regulates the hydrogen supplied into the anode, to increase the amount of hydrogen supplied into the anode. In an exemplary embodiment, the controller 50 may be configured to set a target hydrogen pressure to be greater than a preset hydrogen pressure and may be configured to operate the hydrogen regulator 30 based on the target hydrogen pressure. The target hydrogen pressure may be a target value of the hydrogen pressure inside the anode and may be a preset value. Alternatively, the target hydrogen pressure may be a target value of the supply pressure of the hydrogen supplied into the anode and may be a preset value.

In addition, to increase the amount of hydrogen supplied into the anode, the controller 50 may be configured to operate the air compressor (not illustrated) to increase the pressure of hydrogen supplied into the anode. The controller 50 may be configured to set the target hydrogen pressure to be greater than a preset hydrogen pressure and may be configured to operate the air compressor to adjust the hydrogen supplied into the anode to reach the target hydrogen pressure. In an exemplary embodiment, the controller 50 may be configured to set a target purge frequency to be greater than a preset number of times and may be configured to operate the hydrogen regulator 30 to perform purge as many times as the target purge frequency. The target purge frequency may be the number of times that purge is performed at the time of initially starting the fuel cell stack 10 and may be a preset value.

Hereinafter, step S400 of the method for controlling the fuel cell system according to the exemplary embodiment of the present disclosure will be described in more detail with reference to FIG. 3. The controller 50 may be configured to determine whether the absolute value of a peak air flow-rate value is greater than A (Step S410). A is a preset value greater than zero. In response to determining that the absolute value of the peak air flow-rate value is greater than A, the controller 50 may be configured to maintain the target hydrogen pressure and the target purge frequency (Step S411).

In response to determining that the absolute value of the peak air flow-rate value is less than A, the controller 50 may be configured to determine whether the absolute value of the peak air flow-rate value is greater than B (Step S420). B is a preset value between zero and A. In response to determining that the absolute value of the peak air flow-rate value is greater than B, the controller 50 may be configured to increase the target hydrogen pressure and maintain the target purge frequency (Step S422). Additionally, in response to determining that the absolute value of the peak air flow-rate value is less than B, the controller 50 may be configured to increase the target hydrogen pressure and the target purge frequency (Step S421). The target hydrogen pressure or the target purge frequency may be increased to thus increase the absolute amount of hydrogen supplied into the anode. An exemplary value of A may be 50 kg/hr and an exemplary value of B may be 5 kg/hr. But the values of A and B are not limited to the above exemplary values.

Furthermore, when the fuel cell stack 10 is in a poor sealing state, a substantial amount of air is present inside the cathode and the anode. When a substantial amount of hydrogen is supplied into the anode in this state, excessive voltage may be generated in the fuel cell stack 10 through an electro-chemical reaction of the air and the hydrogen (see FIG. 5B). In addition, when a substantial amount of hydrogen is supplied into the anode in the state in which a substantial amount of air is present in the cathode, high voltage may be generated in the fuel cell stack 10. When a substantial amount of hydrogen is supplied into the anode in the state in which a substantial amount of air is present in the anode, high backward voltage may be generated in the fuel cell stack 10.

Excessive high voltage may damage the fuel cell stack 10. In particular, when high voltage is sustained for a predetermined period of time or longer, the fuel cell stack 10 may be substantially damaged. Therefore, it is desirable to prevent high voltage from being generated. In particular, even though high voltage is generated, the time during which the high voltage is sustained should be reduced.

According to the present disclosure, the fuel cell system may increase the target hydrogen pressure or the target purge frequency to increase the absolute amount of hydrogen supplied into the anode, thereby allowing air and hydrogen remaining in the fuel cell stack 10 to react with each other within a short period of time thus reducing the time during which high voltage is sustained. Accordingly, a possibility of damage to the fuel cell stack 10 may be reduced.

In an exemplary embodiment, when the fuel cell stack 10 is in a poor sealing state, the controller 50 may be configured to perform safety control to temporarily connect a resistor to the fuel cell stack 10. When the fuel cell stack 10 starts normally, the controller 50 may be configured to disconnect the resistor from the fuel cell stack 10, and when excessive high voltage is generated upon start of the fuel cell stack 10, the controller 50 may be configured to connect the resistor to the fuel cell stack 10 to allow the voltage of the fuel cell stack 10 to be applied to the resistor.

Figure 5B:
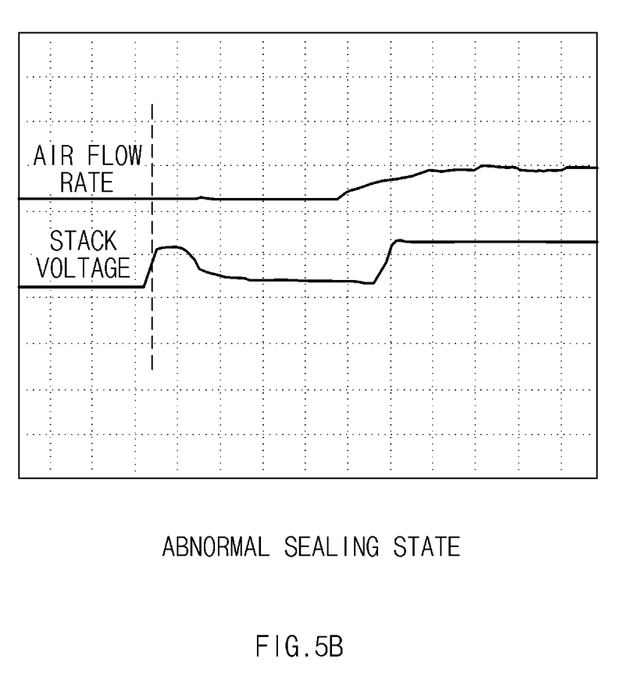

Referring to FIG. 5B, the voltage of the fuel cell stack 10 may be rapidly decreased by performing the safety control. In an exemplary embodiment, before the voltage of the fuel cell stack 10 excessively increases, the controller 50 may be configured to perform safety control to temporarily connect a resistor to the fuel cell stack 10, based on an air flow rate. Accordingly, a possibility of damage to the fuel cell stack 10 may be reduced by performing the safety control based on the air flow rate before the voltage of the fuel cell stack 10 increases excessively.

The present disclosure described above may be implemented as a computer readable code in a non-transitory computer readable recording medium. The non-transitory computer readable recording medium may include all types of storage devices for storing data that can be read by a computer system. Examples of the non-transitory computer readable recording medium may include a hard disk drive (HDD), a solid state disk (SSD), a silicon disk drive (SDD), a ROM, a RAM, a CD-ROM, a magnetic tape, a floppy disk, an optical data storage device, and the like. The non-transitory computer readable recording medium may be implemented in the form of a carrier wave (e.g., transmission over the Internet). Furthermore, the computer may include a processor or a controller.

The above exemplary embodiments are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein. According to the exemplary embodiments of the present disclosure, at least the following effects are achieved.

First, the fuel cell system, when the fuel cell stack starts to operate, may determine the sealing state of the fuel cell stack, based on the air flow rate obtained immediately after the air regulator is opened, thereby directly detecting the sealing performance of the fuel cell stack when the fuel cell system starts to operate.

Second, the fuel cell system may effectively detect the sealing performance of the fuel cell stack to prevent excessive high voltage from being generated in the fuel cell stack or reduce the time during which the high voltage is sustained, even though the high voltage is generated, thereby preventing damage to the fuel cell system.

Effects of the present disclosure are not limited to the aforementioned effects, and any other effects not mentioned herein will be clearly understood from the accompanying claims by those skilled in the art to which the present disclosure pertains. Hereinabove, although the present disclosure has been described with reference to exemplary embodiments and the accompanying drawings, the present disclosure is not limited thereto, but may be variously modified and altered by those skilled in the aft to which the present disclosure pertains without departing from the spirit and scope of the present disclosure claimed in the following claims.

What is claimed is:

1. A method for controlling a fuel cell system, comprising:
   upon start of a fuel cell stack, obtaining, by a controller, a flow rate of air supplied into a cathode after an air regulator configured to regulate the air supplied into the cathode is opened; and
   determining, by the controller, a sealing state of the fuel cell stack, based on the obtained flow rate of the air, wherein the fuel cell stack is determined to be in a normal sealing state when the flow rate of the air is greater than or equal to a preset threshold value and in an abnormal sealing state when the flow rate of the air is less than the preset threshold value.

2. The method of claim 1, wherein the sealing state of the fuel cell stack is determined based on a peak flow rate of the air supplied into the cathode after the air regulator is opened.

3. The method of claim 1, wherein the sealing state of the fuel cell stack is determined based on an absolute value of the flow rate of the air supplied into the cathode after the air regulator is opened.

4. The method of claim 1, further comprising:
   prior to obtaining the flow rate of air supplied into the cathode, operating, by the controller, the air regulator to allow the supply of the air into the cathode and prevent the air from being released from the cathode; and operating, by the controller, a hydrogen regulator to allow supply of hydrogen into an anode and prevent the hydrogen from being released from the anode, when a signal for turning on the fuel cell stack is obtained.

5. The method of claim 4, further comprising:
after determining the sealing state of the fuel cell stack, operating, by the controller, the air regulator to allow the air to be released from the cathode; and
operating, by the controller, the hydrogen regulator to allow the hydrogen to be released from the anode, in response to determining that the fuel cell stack is in a normal sealing state.

6. The method of claim 1, further comprising:
after determining the sealing state of the fuel cell stack, operating, by the controller, a hydrogen regulator to increase an amount of hydrogen supplied into an anode, in response to determining that the fuel cell stack is in an abnormal sealing state,
wherein the hydrogen regulator is configured to regulate the hydrogen supplied into the anode.

7. The method of claim 6, wherein in the operating of the hydrogen regulator, a target hydrogen pressure is set to be greater than a preset hydrogen pressure, and the hydrogen regulator is operated to adjust the hydrogen supplied into the anode to reach the target hydrogen pressure.

8. The method of claim 6, wherein in the operating of the hydrogen regulator, the hydrogen regulator is operated to perform purging a preset number of times in response to determining that the fuel cell stack is in a normal sealing state and perform the purging a target number of times set to be more than the present number of times in response to determining that the fuel cell stack is in an abnormal sealing state, the purging being defined as supplying the hydrogen into the anode for a preset period of time at an increased pressure.

9. A method for controlling a fuel cell system, comprising:
upon start of a furl cell stack, obtaining, by a controller, a flow rate of air supplied into a cathode after an air regulator configured to regulate the air supplied into the cathode is opened;
determining, by the controller, a sealing state of the fuel cell stack, based on the obtained flowrate of the air; and
performing, by the controller, safety control to temporarily connect a resistor to the fuel cell stack to reduce high electric potential generated in the fuel cell stack, in response to determining that the fuel cell stack is in an abnormal sealing state.

10. A fuel cell system, comprising:
at least one processor;
an air flow-rate acquisition device connected to the at least one processor and configured to obtain a flow rate of air supplied into a cathode; and
a memory connected to the at least one processor and configured to store a plurality of instructions,
wherein the instructions, when executed, cause the processor to:
upon start of a fuel cell stack, operate the air flow-rate acquisition device to obtain the flow rate of the air supplied into the cathode after an air regulator configured to regulate the air supplied into the cathode is opened; and
determine a sealing state of the fuel cell stack, based on the obtained flow rate of the air, and
wherein the fuel cell stack is determined to be in a normal sealing state when the flow rate of the air is greater than or equal to a preset threshold value and in an abnormal sealing state when the flow rate of the air is less than the preset threshold value.

11. The system of claim 10, wherein the sealing state of the fuel cell stack is determined based on a peak flow rate of the air supplied into the cathode after the air regulator is opened.

12. The system of claim 10, wherein the sealing state of the fuel cell stack is determined based on an absolute value of the flow rate of the air supplied into the cathode after the air regulator is opened.

* * * * *